United States Patent [19]

Bühler

[11] Patent Number: 4,637,033
[45] Date of Patent: Jan. 13, 1987

[54] BOTTOM ELECTRODE FOR A DIRECT CURRENT ARC FURNACE

[75] Inventor: Karl Bühler, Nussbaumen, Switzerland

[73] Assignee: BBC Brown, Boveri & Company Limited, Baden, Switzerland

[21] Appl. No.: 694,301

[22] Filed: Jan. 24, 1985

[30] Foreign Application Priority Data

Jan. 31, 1984 [CH] Switzerland .................... 445/84

[51] Int. Cl.$^4$ .............................................. H05B 7/02
[52] U.S. Cl. ...................................... 373/72; 373/108
[58] Field of Search ................................ 373/108, 72

[56] References Cited

U.S. PATENT DOCUMENTS 1,763,248 6/1930 Moore .................................. 373/72

Primary Examiner—Roy N. Envall, Jr.
Attorney, Agent, or Firm—Oblon, Fisher, Spivak, McClelland, & Maier

[57] ABSTRACT

Bottom electrodes (6) of direct current arc furnaces, especially during the overheating phase of the melting process, are subjected to very high thermal stresses. As a result of a melting bath flow brought about by electromagnetic forces, the heat supply from the overheated melting bath (13) to the bottom of the electrode(s) (6) is increased still further. This is manifested in a melting back of the metallic component (6') of the bottom electrode in the direction of the furnace crucible base (4). When both the metallic component (6') and the non-metallic refractory component (7') of the bottom electrode (6) are arranged in the direction of the electromagnetic field, that is, in the peripheral direction of the bottom electrode (6), the length (l) of the electrode component is greater than its width (b). Moreover, two zones form in the operating condition of the furnace; namely, an upper, non-metallic zone (7'), which is formed by the apex (7') of dams (7) projecting into the melting bath (13), and a lower zone, which is formed by the slightly melted-back, metallic component (6'). In this way, the metallic component (6') of the bottom electrode (6) is directly protected from the bath flow, and the intensive heat exchange between the melting bath (13) and the bottom electrode (6) is reduced. By inserting non-metallic, refractory components (7) into the bottom electrode, the periphery or diameter of the latter is increased. This measure reduces the electromagnetic field strength in the transition area from the bottom electrode (6) into the melting bath (13), and consequently an additional reduction in the melting bath flow is achieved at the same time.

19 Claims, 8 Drawing Figures

BOTTOM ELECTRODE FOR A DIRECT CURRENT ARC FURNACE

BACKGROUND OF THE INVENTION

The invention relates to an electric furnace such as is known for example from the German Patent Specification No. 21 95 75.

Advances in the development of semiconductor components in previous years have brought about increasing usage of direct current arc furnaces in the iron and steel industry for the electric smelting of steel.

The construction and method of operation of direct current arc furnaces are known for example from the journal "Stahl und Eisen" ("Steel and Iron"), 103 (1983) No. 3, Feb. 14, 1983, pages 133 to 137.

In the case of direct current arc furnaces, in order to optimise the electrical and thermal relationships, it has been shown to be advantageous to form the arc between one or more electrodes, arranged above the melting charge, and the melting charge itself. At least one electrode, the bottom electrode, which is in the bottom of the furnace and is in contact with the melt, is provided for the return circuit of the direct current. The bottom electrode is exposed to a continuous and very high thermal stress, for which materials having a very high fusion and melting point, for example graphite, are suitable. On the one hand, however, when carbon electrodes are used the melt is carbonised. But this is not desirable, especially during the manufacture of low-carbon steels. On the other hand, the carbon electrodes are consumed, which can weaken the furnace bottom and unfavourably affect the electrical power transmission.

According to the proposal of German Patent Specification No. 21 95 75 for achieving the object therein, the bottom electrode consists of a cluster of iron bars which are connected at their lower end to a plate which is also made of iron. The electric current is supplied to the material to be melted or to the melting bath via the plate and the iron bars. A refractory dam which is firmly rammed down is located between the bars and all around the cluster of bars, which dam, in the present case, is made of a magnesite structural material.

A bath movement is brought about by the electromagnetic field of the current flowing through the melting bath from the bottom electrode to the top electrode, which bath movement is particularly intense at the melting bath contact surfaces of the bottom electrode, that is, at those transition areas where the electric current passes over from the relatively small cross section of the bottom electrode to the relatively large cross section of the melting bath.

The melting bath flow acts on the partial contact surfaces which then melt back under the effect of temperature slightly behind the hearth surface, which causes small indentations, so called craters, to form. As a consequence of the relatively high kinetic energy of the bath flow, a cross flow (secondary flow) is induced in these indentations. This causes the partial contact surfaces to melt down still further. However, melting down of the iron bars at their end facing towards the melting bath is to be avoided if possible or at least reduced to a harmless level, because the craters (local cavitation) are not only restricted to the iron bars but also affect the adjacent areas of the refractory structural material, so that crater-like recesses develop. When the liquid charge is poured out of the furnace, the craters are then like-wise emptied and hollow spaces develop which impede subsequent electrical contact of solid constituents to be melted. The intensity of the bath movement is of course also dependent on the strength of the electromagnetic field. For a predetermined current intensity, this electromagnetic field becomes weaker the longer the magnetic field lines are, that is, the greater the periphery or diameter of the bottom electrode is. Because the forces directed towards the melting bath act at right angles to the electromagnetic field lines, a bath movement forms at right angles towards the magnetic field lines, that is, from outside towards the axis of the bottom electrode.

SUMMARY OF THE INVENTION

The invention as characterised in the claims achieves the object of providing an electric furnace the bottom electrode of which has a long life.

An essential characteristic of the invention is that both the metallic and the non-metallic component of the melting bath contact surface have a length, essentially in the direction of the electromagnetic field of the bottom electrode through which current has passed, which is greater than their width. Moreover, the most striking advantage is that, during the overheating phase of the melting operation, the melting bath movement brought about by the electromagnetic forces is prevented from acting directly on the metallic contact surfaces of the bottom electrode and transferring to the latter the heat from the overheated melt. The metallic component of the melting bath contact surface falls back under the effect of temperature slightly behind its non-metallic component, but it then remains stationary. In this way, two zones are formed in the melting bath contact surface; namely, the zone of the non-metallic component, which projects dam-like and only melts at high temperatures, and the zone of the electrically conducting contact surface, which zone melts back easily. The arrangement according to the invention of the two components of the melting bath contact surface in the direction of the electromagnetic field thus prevents, even under an intense overheating of the melting bath, an uncontrolled melting down of the metallic part of the bottom electrode in the direction of the base of the furnace crucible. The melting down depth of the metallic melting bath contact surface, as already mentioned, can be kept almost constant (stationary) throughout the entire melting process, because the action of the bath flow and the associated intensive heat transfer of the melting bath on the metallic contact surface through the dams of the non-metallic component and the relatively narrow width of the metallic contact surface in relation to its length is substantially reduced. Because of the narrow width of the gap, the differences in the electromagnetic field strengths in the gap are small. This results in correspondingly small forces pushing the molten liquid in the gap. The temperature of the melting bath in the gap corresponds at the top to the temperature of the overheated melting bath and at the bottom, near to the contact surface, is about the same as the melting temperature. This difference in temperature corresponds to a difference in the specific density of the liquid which is lighter at the top and heavier at the bottom. This difference in the density of the liquid in the gap counteracts movement of the molten liquid in the gap.

The further development of the inventive subject makes provision for either the metallic component of the melting bath contact surface or its non-metallic component to be designed at least partially as a hollow cylinder or in the shape of a spiral or as a rectangle or in the shape of a meander, and for the nonmetallic or the metallic component to be inserted in complementary manner, with the surface pro-portion of the metallic component being 10 to 70%, in particular 30 to 60%, of the entire melting bath contact surface. By this means, when the bottom electrode is economically produced, flexible adaption to the respective requirements of different electric arc furnace types can be achieved with regard to power characteristics and durability of the bottom electrode.

An advantage of another embodiment can be seen from the fact that the respective operating requirements, on the one hand transferring a high electric current into the melting bath or on the other hand reducing the bath flow as a result of increasing the periphery or diameter of the bottom electrode, can be complied with in suitable manner by arranging a cylinder made of a metal or non-metal within the hollow-cylindrical or rectangular or spiral-shaped or meander-shaped designs of both electrode components.

The struts have the advantage that the dams of the non-metallic component of the bottom electrode, when the metallic contact surface has melted back, can be mutually supported. The improved mechanical stability has a particularly favourable effect in high-performance electric arc furnaces, which have intense bath movement near to the melting bath contact surface of the bottom electrode and no charging of molten material to protect against mechanical damage.

Staggering the struts both in the radial and in the peripheral direction of the bottom electrode again improves the mechanical strengthening of the non-metallic component of the bottom electrode in its melting bath contact surface. In the event that the metallic struts connect the metallic components of the melting bath contact surface of the bottom electrode, the width at this location is so narrow that no essential bath movement develops at the melted-back contact surfaces.

The selection of the ratio of the width of the metallic component to the width of the non-metallic component of the bottom electrode in its melting bath contact surface of between 2:1 and 1:5, preferably 1:2 has the advantage that on the one hand the electrically conducting contact surfaces can be divided into narrow zones which remain largely unaffected by the melting bath flow, and on the other hand the diameter or the periphery of the bottom electrode can be specifically dimensioned for a predeterminable bath flow.

The metallic component of the bottom electrode has chemical contents preferably similar to the melting bath, and its non-metallic component is made of a commercial, refractory structural material. This makes it possible both to produce the bottom electrode economically and operate an electric arc furnace cost-effectively.

The approximately truncated cone-shaped design of the furnace crucible base and the selection of the angle of at least 20° between the cone surface of the furnace crucible base and the melting bath contact surface and also the trumpet-shaped design of the furnace crucible base and the selection of the radius of curvature of at least 30% of the radius of the bottom electrode in the area adjacent to the bottom electrode avoid an abrupt transfer of the electric current and consequently also of the electro-magnetic field from the bottom electrode to the melting bath. This continuous widening of the furnace crucible base reduces the melting bath movement which acts on the melting bath contact surface of the bottom electrode.

BRIEF DESCRIPTION OF THE DRAWINGS

The invention is described in greater detail as follows with reference to illustrative embodiments shown in the drawing, wherein.

DETAILED DESCRIPTION OF THE PREFERRED EMBODIMENTS

Figure 1:
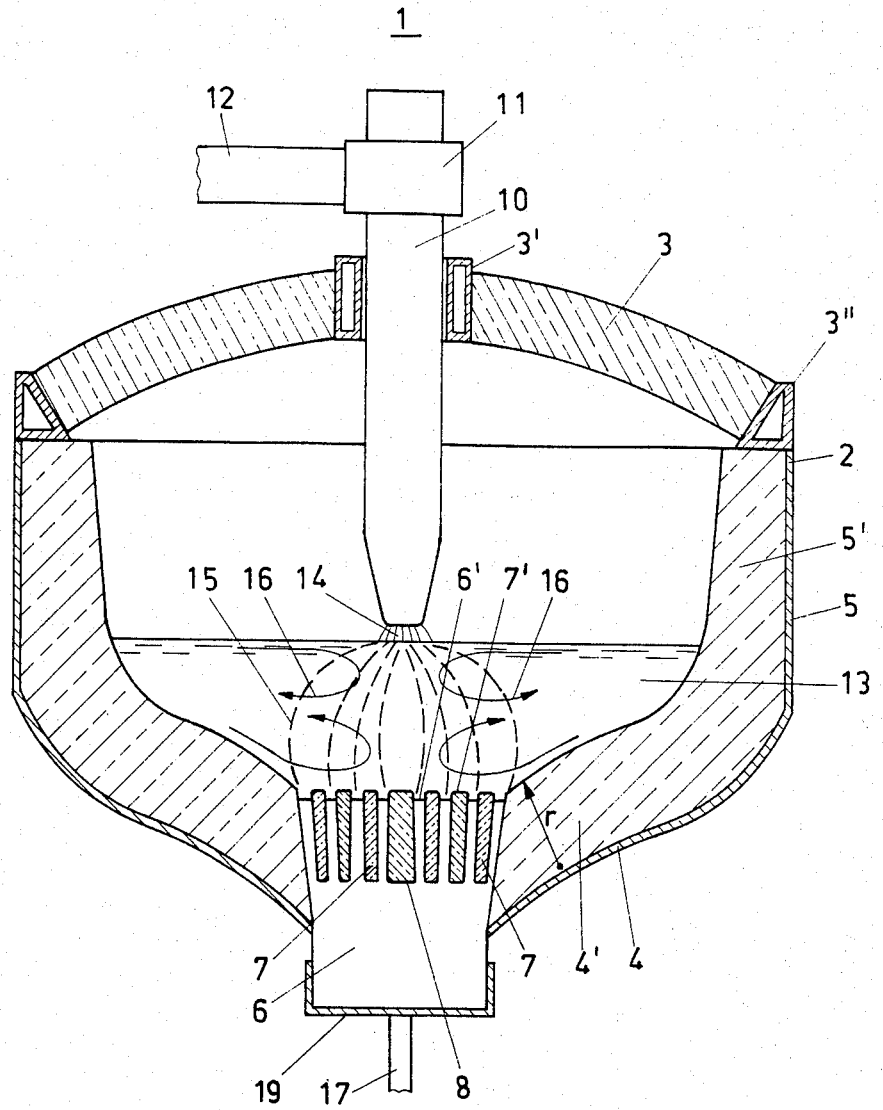
FIG. 1 shows a schematic representation of a vertical section through the electric arc furnace with a bottom electrode.

FIG. 1 shows the electric arc furnace 1 with the furnace crucible 2 and furnace cover 3, with the furnace cover 3, together with the furnace cover ring 3" being supported on the furnace crucible 2. The furnace crucible 2 consists of the crucible base 4 together with the refractory lining 4' and also of the crucible wall 5 together with the refractory lining 5'. A carbon electrode 10 is arranged above the melting bath 13, which carbon electrode 10 projects through an opening in the furnace cover 3. A cooling ring 3' is provided for cooling the electrode 10. The electrode 10 is held in a holder 11 of an electrode support arm 12. The electrode support arm 12 is connected to an electrode control device (not shown in FIG. 1).

In the furnace crucible base 4, 4' can be seen an exemplary embodiment of the bottom electrode 6, according to the invention, which widens conically towards the inside of the furnace crucible. The bottom electrode 6 is held beneath the furnace crucible base 4 by a diagrammatically depicted connecting piece 19 which is designed as a contact socket and at the same time is used for connecting the electrical current supply by the electrical connecting line 17. Non-metallic components 7, 8 of the bottom electrode 6, in its part facing towards the melting bath 13, are fitted as inserts into the bottom electrode 6 which extend about halfway into the latter in the axial direction. In the present embodiment shown in FIG. 1, they consist of three hollow-cylindrical inserts 7 and a central insert 8, by which means the metallic components 6', which are designed like an annular surface, of the melting bath contact surface 6', 7' are mutually divided from one another into narrow zones. The non-metallic components 7, 8 of the bottom electrode 6 are made from a commercial, refractory structural material, for example dolomite or magnesite.

In FIG. 1 the metallic components 6' of the bottom electrode 6 are melted back slightly, and the inserts 7, 8 protruding dam-like and projecting into the melting bath 13 can be easily recognised. The electric arc formed between the point of the top electrode 10 and the surface of the melting bath 13 is designated by the reference number 14 and the electric current lines are designated by the reference number 15. FIG. 1 shows schematically partial flow paths 16 of the melting bath movement which run symmetrically to the vertical axis of the furnace and have both an axial and a radial component. In the central area of the melting bath 13 is first of all formed on the one hand an axial upwards flow from the bottom electrode 6 towards the center of the melting bath 13 and on the other hand an axial downwards flow from the bath surface towards the center of the melting bath 13. The flow is turned in this area and directed radially outwards towards the crucible wall 5, 5'. After repeated turning, the flow again runs radially towards the inside of the furnace and passes across the inserts 7, 8 acting as dams, so that the melting bath contact surfaces 6' remain largely unaffected.

Figure 2:
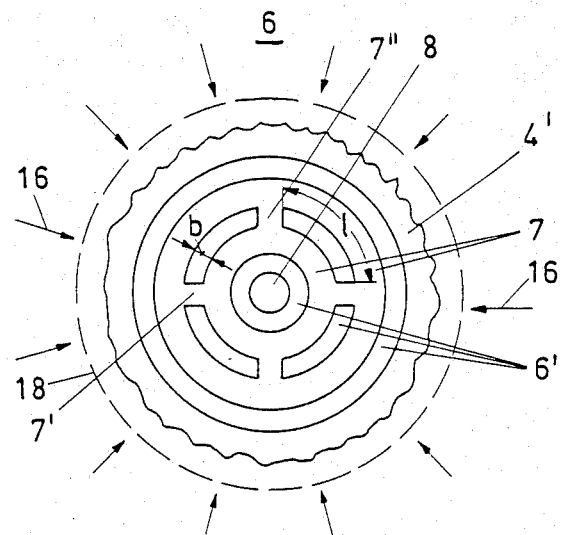
FIG. 2 shows a plan view of the bottom electrode.

FIG. 2 shows a plan view of the bottom electrode 6 which is installed in the refractory lining 4' of the furnace crucible base 4. In this illustrative embodiment, the bottom electrode 6 has an inner and an outer, in each case annular metallic component 6' of the melting bath contact surface 6', 7' which are separated from one another by a refractory insert 7 which acts as a dam. On the other hand, the centre metallic component 6' consists of four annular sections. These are formed by openings, each of which is offset by 90°, interrupting the complete annular surface. Struts 7' are located in these openings, which struts 7' unite the two inserts 7 made of a refractory structural material into a mechanically firm composite. A central insert 8 made of a refractory structural material is arranged in the centre of the bottom electrode 6. The electromagnetic field lines, which run around the outer periphery of the bottom electrode 6, are indicated by the broken line with the reference number 18. The forces which bring about the melting bath flow act at right angles to the field lines 18 and in the radial direction to the bottom electrode 6. They are schematically shown by the arrows with the reference number 16.

Figure 3:
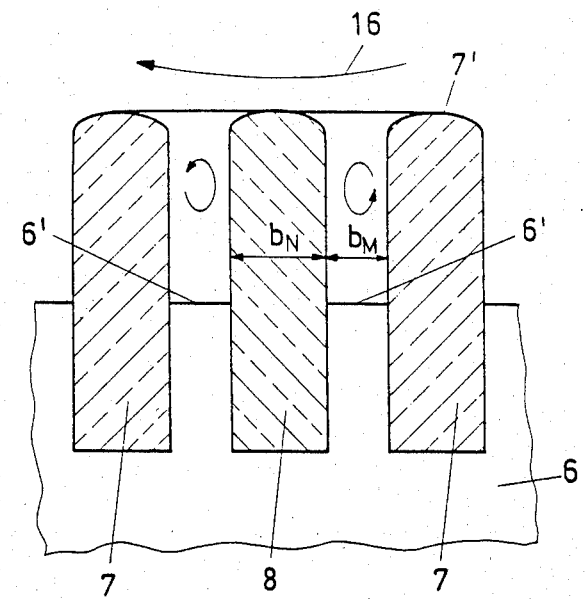
FIG. 3 shows an enlarged representation of a vertical section through the bottom electrode according to FIG. 2.

FIG. 3 shows the metallic components 6' of the melting bath contact surface 6', 7' having been melted back to a considerable extent. It can clearly be seen that the melting bath movement, according to the direction of the arrow 16, passes across the inserts 7, 8 acting as dams, and the relatively narrow, annular contact surfaces 6' are not affected by the melting bath movement 16 at all. A cross flow induced by the kinetic energy of the main flow 16 only acts at the upper part of the gaps formed by the inserts 7, 8; but this cross flow does not affect the contact surface 6'. The width of the non-metallic component 7, 8 is designated $b_N$ and that of the metallic component 6' by $b_M$.

The sectionally interrupted, hollow-cylindrical design of the dams 7 also has the advantage that, during the emptying of the melt when the electric arc furnace is tipped, liquid portions of the melt remain between the dams 7 and resolidify in this location.

If the liquid portions of the contact surfaces 6' between the dams 7, 8 were poured out when the furnace was being emptied this would be problematic for the subsequent melting operation, namely for the following reasons: the relatively brittle dams 7, 8 would be held at their part facing towards the melting bath 13 only by the struts 7', and the metallically supporting part of the contact surfaces would become ineffective. This involves the risk of destroying the upper parts of the dams 7, 8 during the subsequent charging operation. Moreover, a perfect electrical contact between the contact surfaces 6' and the solid charged material at the start of a new melting operation would be in doubt.

It is self-evident that any number of dams 7, 8 can be arranged within the bottom electrode 6. Consequently, at a specified current intensity and with the electrically conducting part of the bottom electrode 6 which is determined by this current intensity, the periphery or diameter of the bottom electrode 6 will be increased. But the larger the periphery of the bottom electrode 6 the longer the electromagnetic field lines 18 become and the greater the reduction in the movement of the melting bath 13 will be.

Inserting electrically non-conducting dams 7, 8 into the bottom electrode 6, for the same conducting cross section of the metallic contact surface 6', brings about on the one hand a reduction in the melting bath flow and on the other hand the contact surfaces 6' are protected from unwanted melting bath movement by the dams 7, 8. When the contact surface is melted back, a bath flow is prevented from forming in the gap because of the narrowness of the latter between two dams. Because of the narrow extent of the gap, the differences in the magnetic field strength in the gap are small. This results in correspondingly lower forces pushing the liquid. The temperature of the melt in the gap corresponds at the top to that of the overheated bath and at the bottom, near to the contact surface, is about the same as the melting temperature. This difference means a difference in the density of the liquid, which is lighter at the top and heavier at the bottom. This stratification counteracts movement (circulation) of the melt.

Figure 4A:
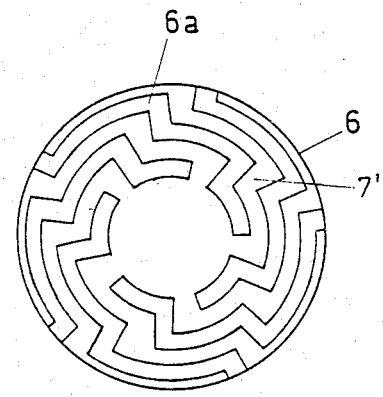
FIG. 4a shows a plan view of the bottom electrode with a meander-shaped design of an electrode component.
Figure 4B:
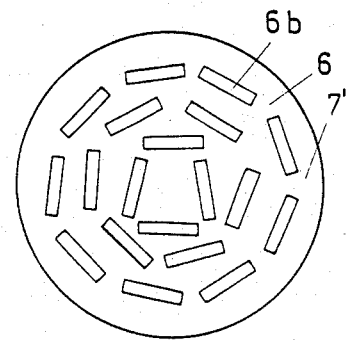
FIG. 4b shows a plan view of the bottom electrode with a rectangular design of an electrode component.
Figure 4C:
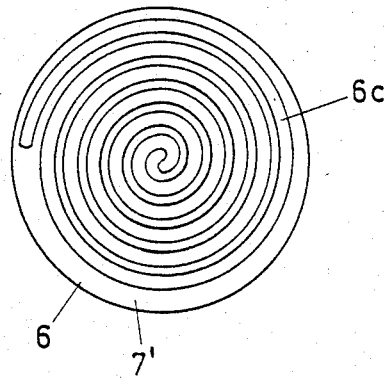
FIG. 4c shows a plan view of the bottom electrode with a spiral-shaped design of both electrode components.

FIGS. 4a to 4c show further embodiments of the metallic component 6' of the melting bath contact surface 6', 7' of the bottom electrode 6. FIG. 4a shows a meander shaped-design 6a, FIG. 4b a rectangular design 6b and FIG. 4c a spiral shaped-design 6c of the metallic part 6' of the melting bath contact surface 6' and 7', with in each case the non-metallic, refractory components 7' being inserted in a complementary manner. In this way, the bottom electrode 6 is made into a unified whole.

The components 6', 7' of the bottom electrode 6 can extend over the entire axial length of the bottom electrode 6. To always ensure the supply of electric current to the bottom electrode 6, the metallic component 6' of the bottom electrode 6, in the area of the electrical connecting piece 9, preferably has a compact design over its entire diameter.

The geometric design of the metallic component 6' and the non-metallic component 7' is not restricted to the illustrative embodiments shown above, and any number of geometric forms are possible.

For a given electrical connecting line of the electric arc furnace, it is important that on the one hand the cross section of the bottom electrode(s) 6 is selected to be as large as possible, and that on the other hand the electrode components 6', 7' run in the direction of the electrical field lines, that is, in the peripheral direction of the bottom electrode 6, wherein the length to width ratio of the electrode components 6', 7' is to be high.

Figure 5A:
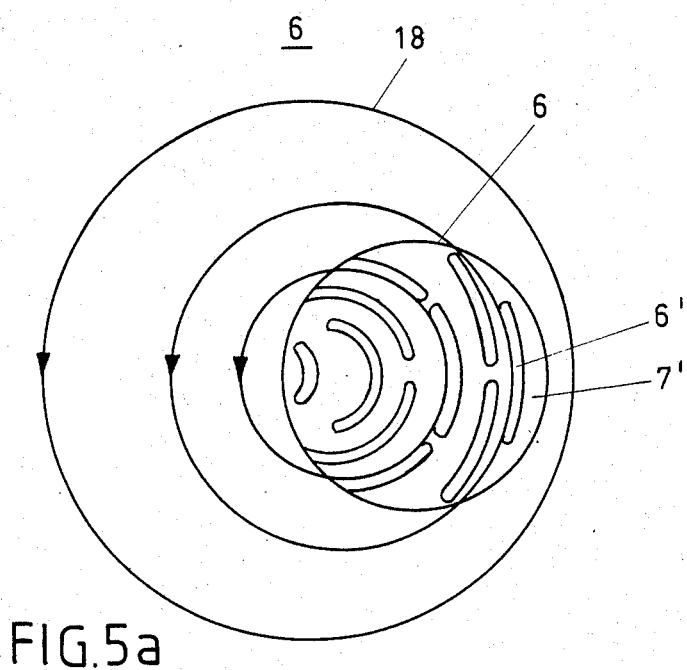
FIG. 5a shows a schematic representation of a plan view of the bottom electrode according to FIG. 5b.
Figure 5B:
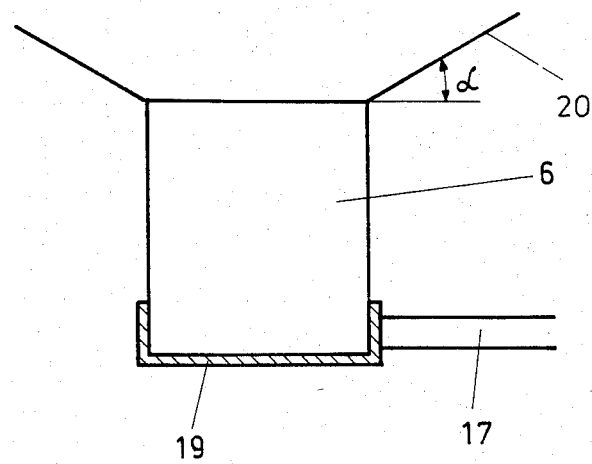
FIG. 5b shows a schematic representation of a side view of the bottom electrode.

FIGS. 5a and 5b show an illustrative embodiment in which both the metallic component 6' and the non-metallic component 7' of the bottom electrode 6 are adapted to the path of the magnetic field lines 18 which is non-concentric relative to the axis of the bottom electrode 6. This non-concentricity of the magnetic field lines 18 is brought about by the relatively high electric current which is supplied laterally to the bottom electrode 6 by the electrical connecting line 17 via the contact socket 19. The magnetic field resulting from this then displaces the electromagnetic field in the bottom electrode 6 in the opposite direction to the electrical connecting line 17. According to FIG. 5a the metallic component 6' and the non-metallic component 7' are designed partially in the shape of a hollow cylinder and are adapted to the magnetic field. This results in an asymmetrical distribution of the components 6', 7' in the cross section of the bottom electrode 6', as can be seen from FIG. 5a.

FIG. 5b shows in schematic form that the hearth surface 20 has a conical design, with the angle between the hearth surface 20 and the melting bath contact surface 6', 7' being at least 20°.

FIGS. 1 and 5b show the furnace crucible 4, 4', 5, 5' and the furnace hearth 20 to be rotationally symmetric. However it is also possible that the said parts 4, 4'; 5, 5'; 20 can be designed to be non-rotationally symmetric. Likewise, the present invention is not only limited to cylindrically designed bottom electrodes 6. Elliptical, square, rectangular or polygonal cross section forms can also be used. Likewise, one or more bottom electrodes 6 can have a hollow-cylindrical design or at least a partially hollow-cylindrical design. Moreover, it is self-evident that any number of bottom electrodes 6 can be built into the furnace crucible base 4, 4', and in fact at any location in the furnace crucible base 4,4'.

I claim:

1. A direct current electric arc furnace for melting metals, comprising:
   a furnace crucible having a base including a hearth surface;
   a top electrode;
   a bottom electrode having a top surface extending into said crucible through said hearth surface; and
   means for forming an arc between said top and bottom electrodes, whereby an electromagnetic field is formed around said bottom electrode,
   wherein said top surface of said bottom electrode comprises at least one metallic component and at least one non-metallic component, said metallic and non-metallic components being complementary in shape and elongate with lengths parallel to said electromagnetic field being greater than widths thereof transverse to said field.

2. The furnace of claim 1 wherein a surface proportion of said metallic component to said top surface is between 10 and 70%.

3. The furnace of claim 1 wherein a surface proportion of said metallic component to said top surface is between 30 and 60%.

4. The furnace of claim 1, wherein said metallic and non-metallic components are hollow cylindrical and mutually concentric about the vertical axis of said bottom electrode.

5. The furnace of claim 3, wherein said metallic and non-metallic components are hollow cylindrical and mutually concentric about the vertical axis of said bottom electrode.

6. The furnace of claim 1, wherein said magnetic and non-magnetic components are spiral.

7. The furnace of claim 3, wherein said magnetic and non-magnetic components are spiral.

8. The furnace of claim 1, wherein one of said magnetic and non-magnetic components is rectangular.

9. The furnace of claim 3, wherein one of said magnetic and non-magnetic components is rectangular.

10. The furnace of claim 1, wherein said magnetic and non-magnetic components are meandering-shaped.

11. The furnace of claim 3, wherein said magnetic and non-magnetic components are meandering-shaped.

12. The furnace of claim 4 including non-metallic struts mechanically connecting adjacent ones of said non-metallic electrode components.

13. The furnace of claim 12 wherein said struts are mutually staggered in radial and circumferential directions about said vertical axis.

14. The furnace of claim 1 wherein a ratio of said width of said metallic component to said width of said non-metallic component is between 2:1 and 1:5 at said top surface.

15. The furnace of claim 14 wherein said ratio is 1:2.

16. The furnace of claim 1 wherein said non-metallic component is formed of a refractory material having an electrical conductivity less than that of the metallic component and a melting point higher than that of the metallic component, said metallic component having the same chemical composition as a melting bath in said furnace.

17. The furnace of claim 1 wherein said hearth surface is in the shape of a truncated cone enclosing an angle of at least 20° with respect to the horizontal.

18. The furnace of claim 1 wherein said hearth surface is trumpet shaped.

19. The furnace of claim 18 wherein said hearth has a radius of curvature r which is at least 30% of a radius of said bottom electrode.

* * * * *